United States Patent
Estes

(10) Patent No.: US 9,558,199 B2
(45) Date of Patent: Jan. 31, 2017

(54) EFFICIENT DATA DEDUPLICATION

(71) Applicant: Jive Software, Inc., Portland, OR (US)

(72) Inventor: James Donald Estes, Superior, CO (US)

(73) Assignee: Jive Software, Inc., Portland, OR (US)

( * ) Notice: Subject to any disclaimer, the term of this patent is extended or adjusted under 35 U.S.C. 154(b) by 101 days.

(21) Appl. No.: 13/788,729

(22) Filed: Mar. 7, 2013

(65) Prior Publication Data

US 2014/0258245 A1    Sep. 11, 2014

(51) Int. Cl.
*G06F 17/30* (2006.01)

(52) U.S. Cl.
CPC .................. *G06F 17/30156* (2013.01)

(58) Field of Classification Search
CPC G06F 3/0641; G06F 3/0608; G06F 17/30156; G06F 11/1453; G06F 17/30371; G06F 17/30303; G06F 17/30097; G06F 11/1448; G06F 17/30091; G06F 17/30312; G06F 17/30598
USPC ... 707/692, 693, E17.005, E17.002, E17.01, 707/812, E17.007, 737, E17.014, 707/E17.044, 609, 640, 664, 697, 698, 707/747, 791, 797, 822, E17.009, 707/E17.046, E17.055, 637, 646, 707/687, 756, 769, 813, 821, 828, 707/E17.054, E17.089, 625, 633, 635, 707/655, 674, 675, 688, 690, 694, 699, 707/709, 741, 758, 780, 802, 803, 814, 707/823, 824, 825, 826, 827, 968, 707/969, 970, 971, 972, 973, 974, 707/999.006; 711/216, 114, 100; 709/226, 709/206, 215, 232, 223, 224
See application file for complete search history.

(56) References Cited

U.S. PATENT DOCUMENTS

| | | | |
|---|---|---|---|
| 6,928,526 B1* | 8/2005 | Zhu et al. ...................... 711/154 |
| 8,549,004 B2* | 10/2013 | Lakshminarayan et al. . 707/737 |
| 8,793,226 B1* | 7/2014 | Yadav ............... G06F 17/30156 |
| | | | 707/692 |
| 2004/0085963 A1* | 5/2004 | Ying .............................. 370/394 |
| 2009/0089248 A1* | 4/2009 | Alexander ........ G06F 17/30899 |
| 2009/0182953 A1* | 7/2009 | Merkey et al. ............... 711/136 |
| 2011/0087640 A1* | 4/2011 | Dodd et al. ................... 707/693 |
| 2013/0179476 A1* | 7/2013 | Saam et al. .................... 707/803 |

OTHER PUBLICATIONS

Bhattacherjee et al. ("High Throughput Data Redundancy Removal Algorithm with Scalable Performance"; ACM New York, NY, USA 2011; ISBN: 978-1-4503-0241-8).*
Search Storage, "Data deduplication (Intelligent compression or single-instance storage," http://searchstorage.techtarget.com/definition/data-deduplication, pp. 5-6, Jul. 2010, (downloaded Mar. 7, 2013).
Wikipedia, "Data deduplication," http://en.wikipedia.org/wiki/Data_deduplication, pp. 1-4, (downloaded Mar. 7, 2013).

(Continued)

*Primary Examiner* — Jay Morrison
*Assistant Examiner* — Ken Hoang
(74) *Attorney, Agent, or Firm* — Klarquist Sparkman, LLP

(57) ABSTRACT

Efficient data deduplication is described herein. A deduplication bit array partition can be created that corresponds to a number of data items in an expected dataset. The deduplication bit array partition can track whether the data items have been received. When a data item in the expected dataset is received, a bit in the deduplication bit array partition corresponding to the received data item can be accessed to determine, based on the value of the bit, if the received data item has already been received. When the value of the bit indicates that the received data item has not already been received, the value can be changed to indicate that the data item has now been received. When the value of the bit (Continued)

indicates that the received data item has already been received, the data item can be deleted or ignored.

17 Claims, 6 Drawing Sheets

(56)  References Cited

OTHER PUBLICATIONS

Symantec, "De-Duplication (Overview in Backup Environment)," http://www.symantec.com/connect/articles/de-duplication-over-view-backup-environment, pp. 1-2, Nov. 25, 2009, (downloaded Mar. 7, 2013).

Wikipedia, "Bloom Filter," http://en.wikipedia.org/wiki/Bloom_filter, pp. 1-13, (downloaded Mar. 7, 2013).

\* cited by examiner

EFFICIENT DATA DEDUPLICATION

BACKGROUND

Data deduplication involves analyzing a dataset or file to identify and remove redundant data. Removing redundant data saves storage space and can make subsequent data processing more efficient and less resource intense. The data deduplication process itself, however, can be resource intensive. Data can, for example, be conventionally deduplicated using a bloom filter. With a bloom filter, several hash operations are performed on an identifier associated with each received data item. Multiple hash operations are necessary to prevent collisions, resulting in a large amount of storage space. Additionally, despite the reduction in collisions provided by performing multiple hashes, collisions still occur, resulting in false positives (and therefore lost data) in the deduplication process.

SUMMARY

Technologies are described for efficiently deduplicating data. A deduplication bit array partition can be created that corresponds to a number of data items in an expected dataset. The deduplication bit array partition can track whether the data items have been received. When a data item in the expected dataset is received, a bit in the deduplication bit array partition corresponding to the received data item can be accessed to determine if the received data item has already been received. When the value of the bit indicates that the received data item has not already been received, the value can be changed to indicate that the data item has now been received. When the value of the bit indicates that the received data item has already been received, the data item can be deleted or ignored.

The data items in the expected dataset can have sequential numeric identifiers. An initial bit at a first position in the deduplication bit array partition can correspond to the numeric identifier of an initial data item in the expected dataset. Subsequent, sequentially numbered data items can correspond to bits at subsequent, sequential positions in the deduplication bit array partition. Multiple deduplication bit array partitions can be created to deduplicate a large number of data items.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the invention will become more apparent from the following detailed description, which proceeds with reference to the accompanying figures.

DETAILED DESCRIPTION

The techniques and solutions described herein allow efficient deduplication of data. In addition to conserving computing resources, data deduplication improves the accuracy of collected data by removing redundant data. Data can be efficiently deduplicated by creating deduplication bit array partitions (also referred to herein as "partitions") to track expected data. When expected data items have sequentially numbered identifiers (where each unique data item has a corresponding unique numbered identifier, and where duplicate data items have the same unique numbered identifier), for example, corresponding sequential bits, one for each data item, can be used to track the data items. In this way, the amount of memory and/or storage used to deduplicate N expected data items is reduced to N bits. Additionally, the number of false positives is reduced to zero. Examples are described below with reference to FIGS. 1-6.

Figure 1:
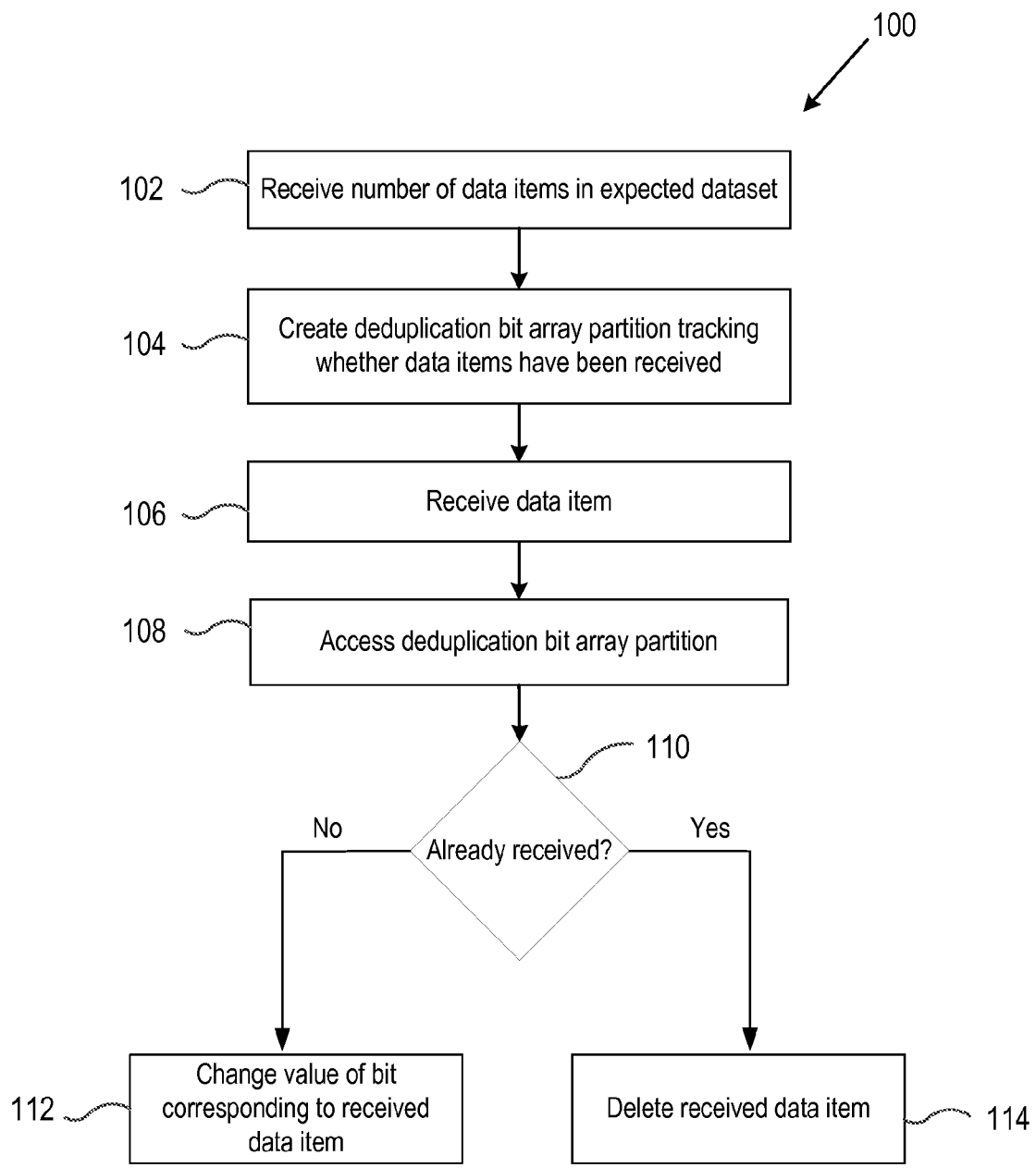
FIG. 1 is a flowchart of an example method for deduplicating data using a deduplication bit array partition.

FIG. 1 illustrates a method 100 for deduplicating data. In process block 102, a number of data items in an expected dataset is received. An "expected dataset" includes a plurality of unique data items that a deduplication system is expecting. For example, the deduplication system may be expecting a number N of data items that have unique numeric identifiers between X and Y, where Y=X+N. In such an example, the number N is received in process block 102.

In process block 104, a deduplication bit array partition is created that tracks whether data items have been received. A data item in the expected dataset is received in process block 106. In process block 108, the deduplication bit array partition is accessed to determine in process block 110 if the received data item has already been received. If the received data item has not already been received, a value of a bit in the deduplication bit array partition corresponding to the received data item is changed in process block 112. When the data item has not already been received, the data item can be saved (e.g. stored in a database). If the received data item has already been received, the received data item is deleted in process block 114. In some examples, the received data item is ignored (or simply not saved) rather than being deleted. In other examples, the received item is saved over the previously received data item (duplicate).

The data items in the expected dataset can have numeric identifiers, and the numeric identifiers can be sequential. In one such example, when the deduplication bit array partition is created in process block 104, an initial bit at a first position in the deduplication bit array partition is associated with and corresponds to the numeric identifier of an initial data item in the expected dataset. Subsequent, sequentially numbered data items are associated with and correspond to bits at subsequent, sequential positions in the deduplication bit array partition. For example, if data items with identifiers 1201 through 1467 are expected, a deduplication bit array partition corresponding to this expected data can include 266 bits—one bit corresponding to each expected data item. A first bit at position 1 can correspond to data item 1201, a second bit at position 2 can correspond to data item 1202, a third bit at position 3 can correspond to data item 1203, and so forth. Data items, however, are not necessarily received in sequential order.

In some examples, process block 110, in which it is determined if the received data item has already been received, comprises identifying a bit value of a bit in the deduplication bit array partition corresponding to the numeric identifier of the received data item. The bit value indicates whether the received data item has already been received. For example, the deduplication bit array partition can be established with a value of 0 for all of the bits or a value of 1 for all of the bits. When a data item is received, the value of the corresponding bit is changed. If another data item having the same identifier is subsequently received, when the corresponding bit is accessed, the bit value will indicate that a data item with that identifier has already been received and that the current data item is therefore a duplicate. In some examples, bit values are initialized as 0 and changed to 1 when a data item with the associated identifier is received.

Figure 2:
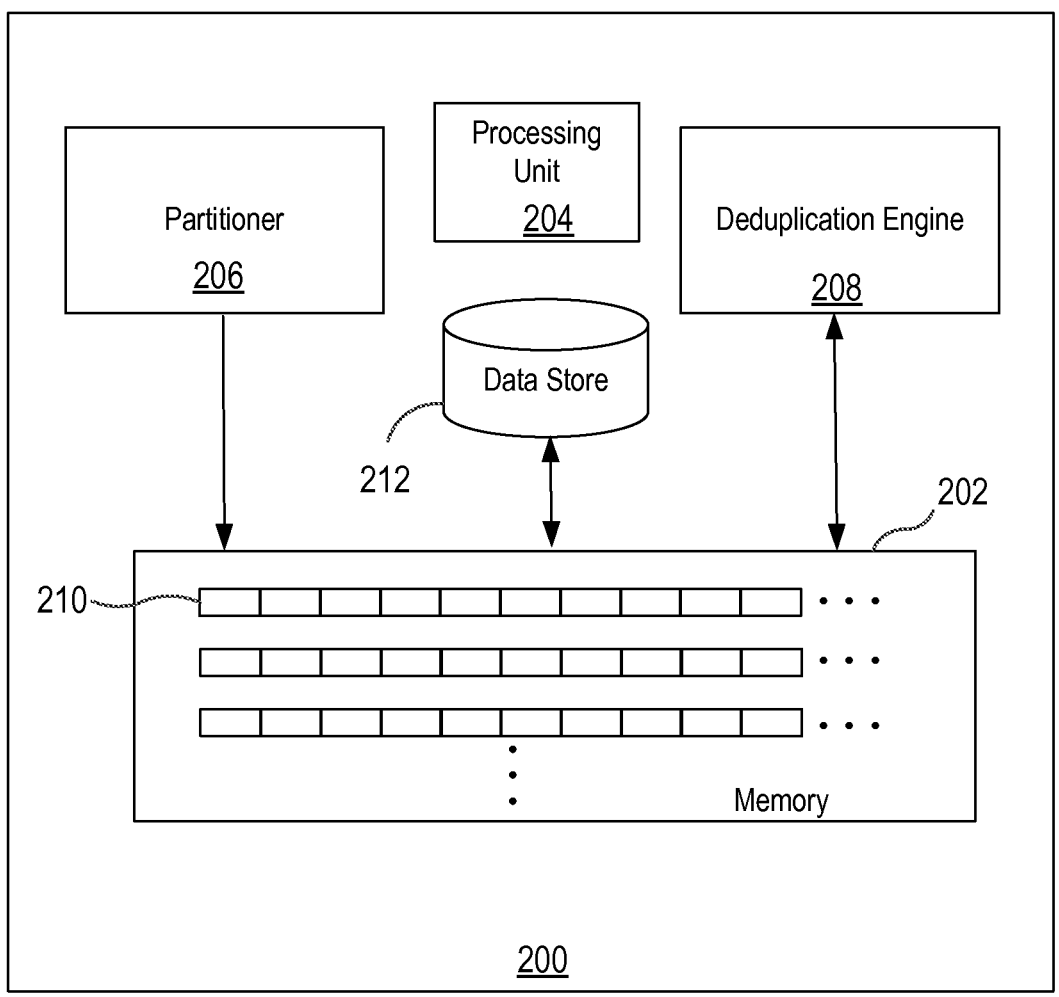
FIG. 2 is an example data deduplication system.

FIG. 2 illustrates a data deduplication system 200. Deduplication system 200 can, for example, be implemented on one or more server computers and includes a memory 202 and a processing unit 204. Deduplication system 200 also includes a partitioner 206 and a deduplication engine 208 (e.g., implemented in software and/or hardware of the one or more server computers). Partitioner 206 is executed by processing unit 204 and creates one or more deduplication bit array partitions 210 in memory 202 that tracks whether expected data items each having a numeric identifier have been received. Deduplication engine 208, which is also executed by processing unit 204, receives expected data items and determines if the received expected data item has already been received. Data store 212 can store received data items as well as partitions that have been transferred from memory 202 (for example, older partitions transferred to make room for newly created partitions). Example detailed functionality of partitioner 206 and deduplication engine 208 is illustrated in FIG. 3.

Figure 3:
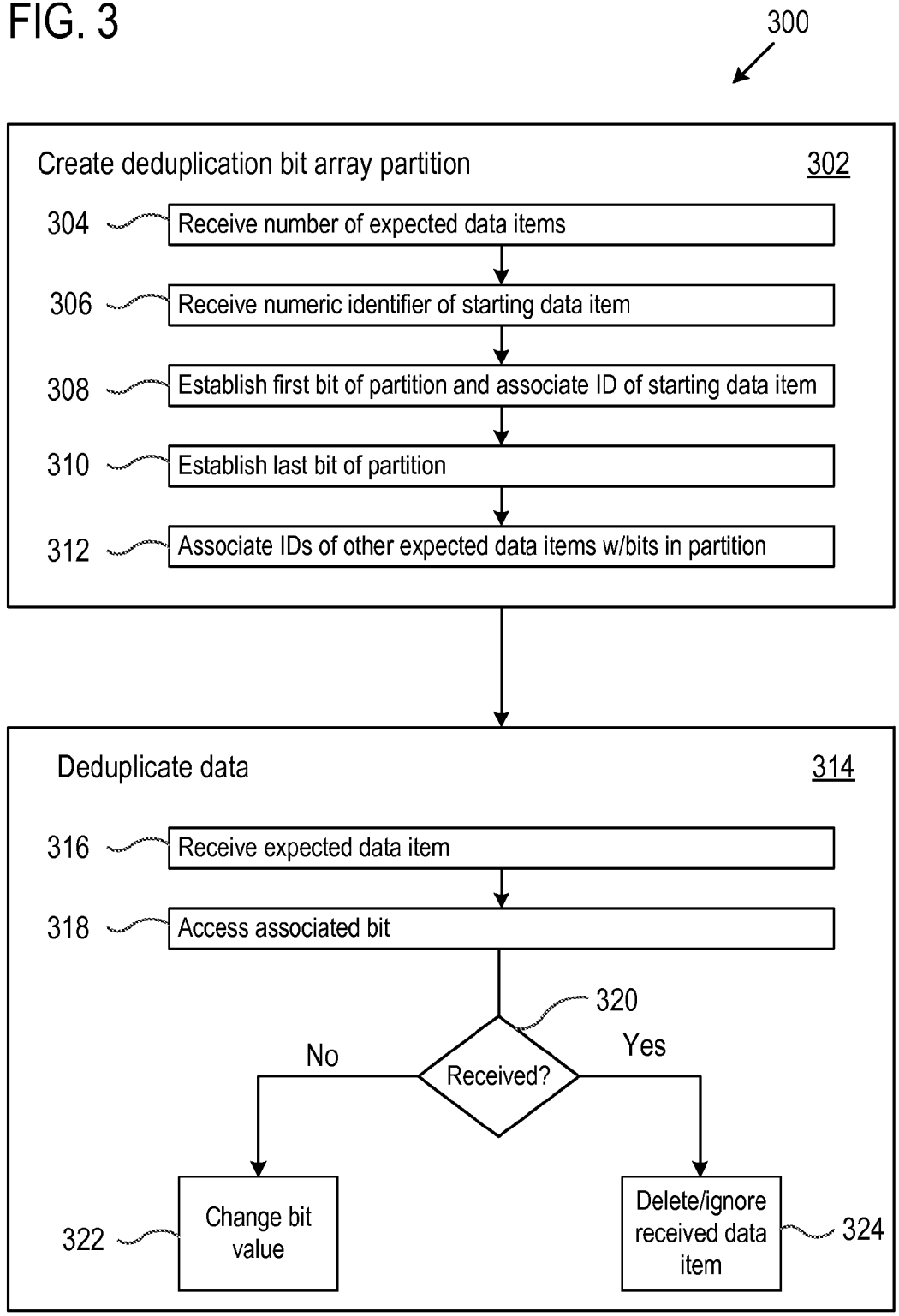
FIG. 3 is a flowchart of an example method for deduplicating data detailing creation of a deduplication bit array partition.

FIG. 3 illustrates a method 300 of deduplicating data. In process block 302, a deduplication bit array partition is created. In process block 304, a number of expected data items is received. A numeric identifier of a starting expected data item is received in process block 306. In process block 308, a bit is established as a first bit of the partition. The first bit is associated with the numeric identifier of the starting expected data item. A last bit of the partition is established in process block 310 such that the partition includes at least as many bits as the number of expected data items. For example, a one-to-one ratio of expected data items to bits can be established. In such an example, an expected data item having a numeric identifier equal to the numeric identifier of the starting expected data item plus an integer L is associated with a bit having a position in the partition of the first bit plus L. In process block 312, the numeric identifiers of each of the expected data items (other than the starting expected data item) are associated with a bit of the partition. Process block 302, including process blocks 304, 306, 308, 310, and 312, can be performed by partitioner 206 in FIG. 2.

In process block 314, data is deduplicated. An expected data item is received in process block 316. The bit in the partition corresponding to the identifier of the received expected data item is accessed in process block 318. In process block 320, it is determined if the received expected data item has already been received by identifying the value of the bit (i.e., bit value, either "1" or "0", can be designated to indicate that the data item corresponding to a particular bit location has been received). In process block 322, when the value of the bit indicates that the received expected data item has not already been received, the value of the bit is then changed to the other bit value. For example, if a bit value of "0" indicates that a data item has not been received, then the bit value would be changed from "0" to "1" at 322. In process block 324, when the value of the bit indicates that the received expected data item has already been received (e.g., when the bit value is "1"), the received data item is then deleted or ignored. Process block 314, including process blocks 316, 318, 320, 322, and 324, can be performed by deduplication engine 208 in FIG. 2.

Returning to FIG. 2, deduplication engine 208 can create multiple deduplication bit array partitions like partition 210. Multiple partitions can be created, for example, to manage extremely large amounts of data. In some examples, each partition represents a time unit, and the number of expected data items in a partition is a number of data items expected to be received in that time unit. In one example, a partition is created to track one day's worth of data. A selected number of partitions can be maintained such that the corresponding number of days' worth of data can be deduplicated. For example, one day, one week, one month, one quarter, or one year's worth of data can be deduplicated by having a corresponding number of partitions. In other examples, partitions can represent different units of time (e.g., partitions can represent a number of minutes, hours, days, or another unit of time).

Figure 4:
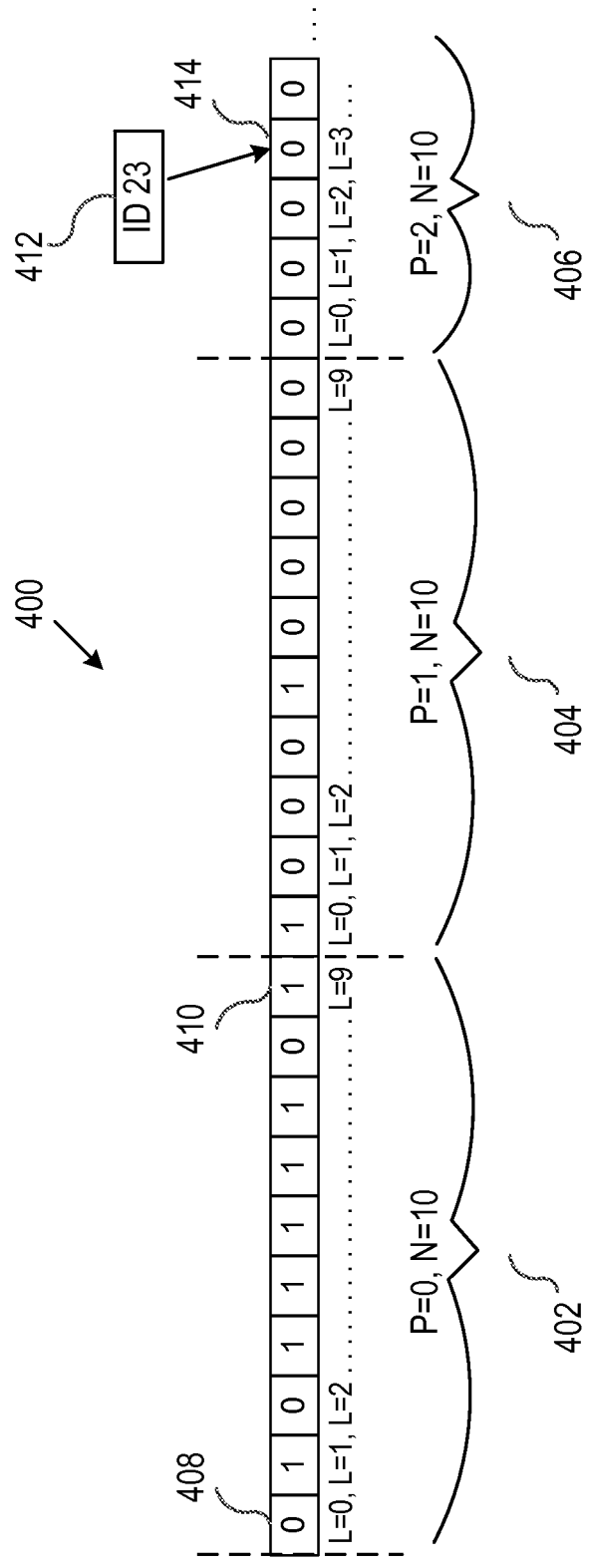
FIG. 4 is an example of multiple deduplication bit array partitions.

An example plurality of partitions 400 is shown in FIG. 4. Partitions 402, 404, and 406 are included. In FIG. 4, "P" is the number of the partition; "N" is the number of expected data items tracked by a particular partition; and "L" is the bit position in a particular partition. Thus, for partition 402, P=0, N=10, first bit 408 of partition 402 is at position L=0, and last bit 410 of partition 402 is at position L=9. Each of partitions 402, 404, and 406 have ten bits (N=10). In other examples, N varies from partition to partition. If bit 408 (L=0, P=0) is assigned to an expected data item with a numeric identifier of 0, then the sequential, one-to-one correspondence between bits and expected data items allows the plurality of partitions to be used for deduplication. For example, if an expected data item with a numeric identifier of 23 is received, it can be determined that bit 414 is associated with the identifier 23, and the value of bit 414, 0, is used to determine if an expected data item with identifier 23 has already been received.

When N is a uniform size across the plurality of partitions, the bit associated with the numeric identifier of an expected data item can be determined by first dividing the identifier by N to identify the correct partition and then performing a modulus N operation to identify the correct bit. In the example of an identifier of 23 where N=10, the division operation returns 2, and the modulus operation returns 3. Thus, the bit associated with a data item identifier of 23 is in partition P=2 at position L=3. Adjustments can be made to this approach if numbering is started, for example, at one instead of zero.

In many situations, expected data items are received out of order but still within a general time window. For example, if a particular type of data is being streamed, occasional data items will not be consecutively numbered but may still be within a particular number of being consecutive or a few days or a few weeks' worth of data of being consecutive. In such situations, a plurality of partitions can be maintained in memory to ensure that even if a received data item is out of order, the partition having the bit associated with the received data item's identifier is still stored in memory. In some examples, a plurality of partitions are stored in memory and additional partitions are stored in permanent storage, such as a hard drive or disk. In one example, a number of partitions is determined for storage in memory, and as additional partitions are created to track expected data, an equal number of the oldest partitions are written to permanent storage and erased from memory. In some examples, if the partition having the bit corresponding to a received data item's identifier cannot be found in memory, the partition can be loaded from permanent storage.

Additionally, for fault tolerance, the numeric identifiers of expected data items can be written to an append-only file for each partition while data items are being received. This allows recovery after a power failure, for example. Recovery involves loading the append file and "re-receiving" the identifiers to effectively re-load the last known bit values in the partitions. The append file can be deleted for a partition that has been written to permanent storage.

Figure 5:
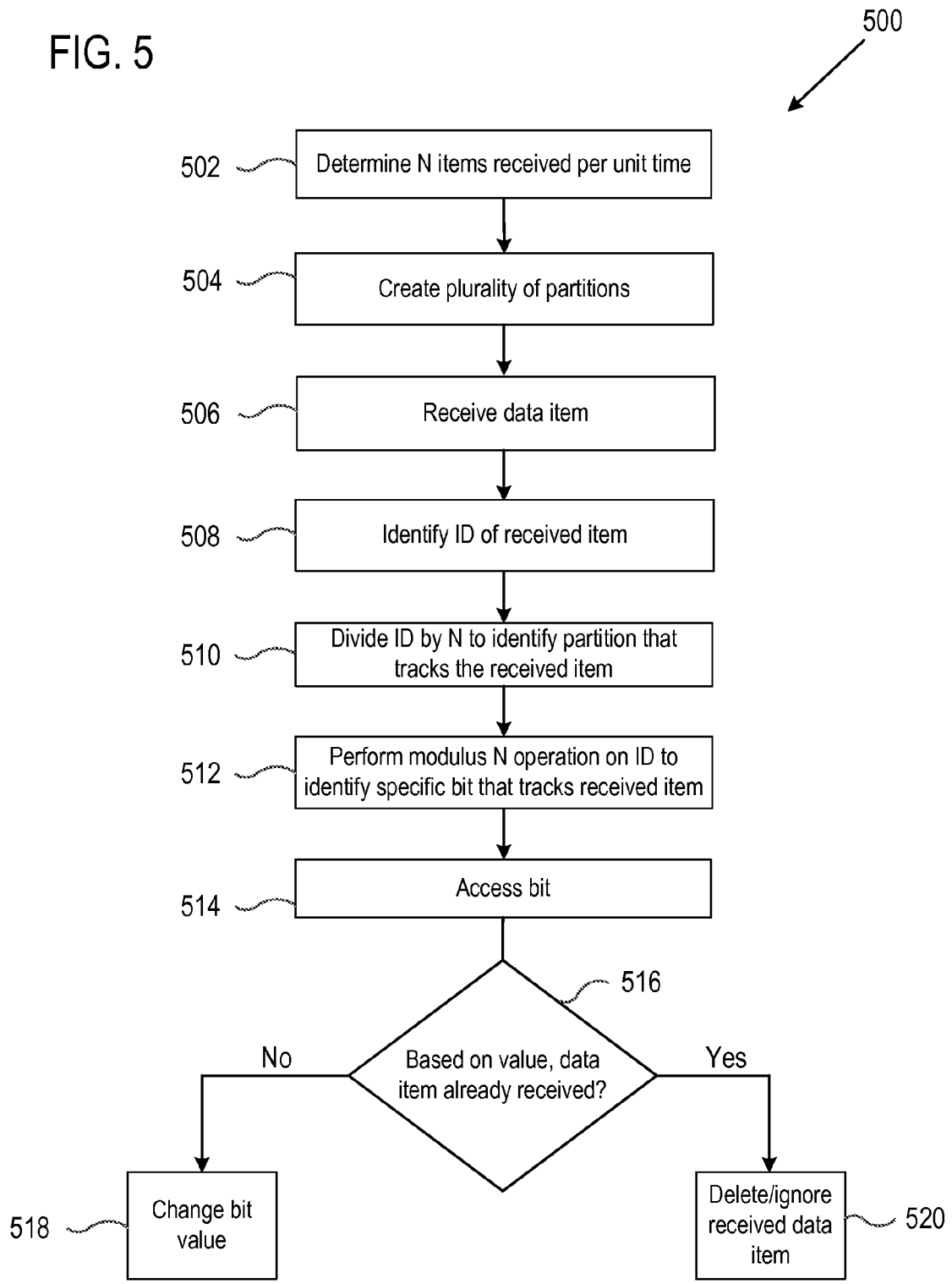
FIG. 5 is a flowchart of an example method for deduplicating data detailing the determination of whether a data item has already been received.

FIG. 5 illustrates a method 500 of deduplicating a dataset. In process block 502, a number N of data items expected to be received per time unit is determined. The data items each have a numeric identifier (also referred to as an "ID"). A plurality of deduplication bit array partitions are created in process block 504. Each deduplication bit array partition tracks whether data items expected to be received during one time unit have already been received. A data item is received in process block 506. In process block 508, a numeric identifier of the received data item is identified. In process block 510, the numeric identifier of the received data item is divided by N to identify a specific deduplication bit array partition of the plurality of deduplication bit array partitions that tracks the received data item. In process block 512, a modulus N operation is performed on the numeric identifier of the received data item to identify a bit in the specific partition that is associated with the numeric identifier. The bit is accessed in process block 514. In process block 516, it is determined, based on the value of the bit, whether the data item has already been received. If the data item has not already been received, then the value of the bit is changed in process block 518. If it is determined that the data item has already been received, then the data is deduplicated by deleting or ignoring the received data item in process block 520.

Specific Example—Twitter Data

Twitter data, or "Tweets," (Twitter and Tweet are registered trademarks of Twitter, Inc.) has unique, numeric 64-bit identifiers. The Twitter "firehose" source of streaming data is roughly ordered and can be out-of-order by up to a few hours. Tweets can also be obtained from other data sources that may be out-of-order by an even larger time period (e.g. one month). As Tweets are received, a deduplication system such as that described with reference to FIG. 2, can identify and delete or ignore Tweets that have already been processed. Duplicate Tweets can be identified because they will have the same unique numeric 64-bit identifier.

Although Twitter currently generates approximately 350 million Tweets per day, this example will assume one billion Tweets per day. A deduplication bit array partition can be established for each day, with a number of bits N=1,000,000,000. Although firehose data is roughly ordered, 30 partitions, corresponding to 30 days (approximately one month) of data, can be created to account for out-of-order Tweets gathered from other sources. Each partition (one day) is a bit array of one billion bits (119 megabytes), making the total size of 30 partitions 3.49gigabytes, fitting easily into commonly available memory. Partitions can be flushed to disk after 31 days.

A bloom filter configured to deduplicate the same quantity of Twitter data, in contrast, requires approximately 80 gigabytes of memory (assuming 5 hash computations per key and 30 billion tweets). Additionally, the bloom filter would have a false positive rate of 1 for every 3,500 Tweets, even with a good hash function. This equates to 29,000 missed Tweets per day for a one billion per day rate. The deduplication bit array partition approach, however, has no false positives and take up dramatically less space.

Example Computing Environment

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 6:
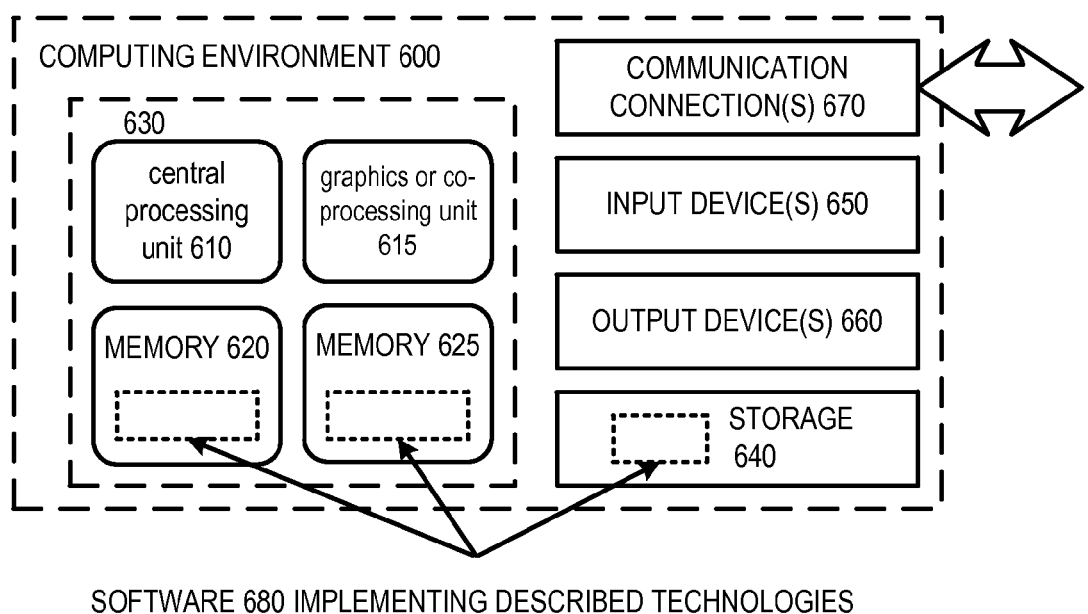
FIG. 6 is a block diagram illustrating an example computing environment in which techniques and tools described herein may be implemented.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600. The communication connection(s) 670 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and/or storage 640. The term computer-readable storage media does not include communication connections (e.g., 670) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A computer-implemented method for deduplicating a dataset, the method comprising:
   receiving a number indicating a count of unique data items in an expected dataset to be received per time unit, prior to analyzing any data items in the expected data set, wherein the unique data items are unique within the expected dataset;
   in response to receiving the number, creating a plurality of deduplication bit array partitions of a size corresponding to the number of unique data items in the expected dataset to be received per time unit, the respective deduplication bit array partitions tracking whether data items expected to be received during one time unit have been received, wherein a size of the respective deduplication bit array partitions corresponds to the received number indicating the count of unique data items in an expected dataset to be received per time unit, wherein the plurality of deduplication bit array partitions are stored in memory;
   receiving a data item in the expected dataset;
   identifying a specific deduplication bit array partition, of the plurality of deduplication bit array partitions, that tracks whether data items, including the received data item, expected to be received during a specific time unit have already been received;
   accessing the specific deduplication bit array partition to determine if the received data item has already been received;
   upon determining that the received data item has not already been received, changing a value of a bit in the specific deduplication bit array partition corresponding to the received data item;
   creating a new deduplication bit array partition;

writing an oldest of the plurality of deduplication bit array partitions to permanent storage; and deleting the oldest of the plurality of deduplication bit array partitions from memory.

2. The computer-implemented method of claim 1, further comprising:

receiving an additional data item in the expected dataset;

accessing the specific deduplication bit array partition to determine if the additional data item has already been received; and upon determining that the additional data item has already been received, deleting the additional data item.

3. The computer-implemented method of claim 1, wherein the data items in the expected dataset, including the received data item, have numeric identifiers.

4. The computer-implemented method of claim 3, wherein numeric identifiers of the data items in the expected data set are sequential, wherein an initial bit at a first position in a first of the plurality of deduplication bit array partitions corresponds to the numeric identifier of an initial data item in the expected dataset, and wherein subsequent, sequentially numbered data items correspond to bits at subsequent, sequential positions in the deduplication bit array partitions.

5. The computer-implemented method of claim 3, wherein accessing the specific deduplication bit array partition to determine if the received data item has already been received comprises identifying a bit value of a bit in the specific deduplication bit array partition corresponding to the numeric identifier of the received data item.

6. The computer-implemented method of claim 1, wherein the new deduplication bit array partition corresponds to additional data expected to be received during an additional time unit.

7. The computer-implemented method of claim 6, further comprising:

upon receiving an additional data item, determining, based on a numeric identifier of the additional data item, whether to access the new deduplication bit array partition or one of the plurality of deduplication bit array partitions; and determining whether the additional data item has already been received.

8. A data deduplication system comprising:

a memory;

a processing unit;

a permanent storage;

a partitioner, executed by the processing unit, configured to:

create a plurality of deduplication bit array partitions in the memory that track whether expected data items each having a numeric identifier have been received, wherein a specific deduplication bit array partition is created by:

receiving a number indicating how many unique data items are expected to be received in a first time unit and a numeric identifier of a starting data item expected to be received in the first time unit before processing any data items expected to be received in the first time unit, wherein the unique data items are unique within the expected data items; and in response to receiving the number and the numeric identifier:

establishing a bit as a first bit of the specific deduplication bit array partition, of the plurality of deduplication bit array partitions, that tracks whether the data items expected to be received during the first time unit have already been received, and associating the first bit with the numeric identifier of the starting data item expected to be received in the first time unit;

establishing a last bit of the specific deduplication bit array partition such that the specific deduplication bit array partition includes at least as many bits as the number indicating how many unique data items are expected to be received in the first time unit; and associating the numeric identifiers of each of the expected data items other than the starting expected data item with a bit of the specific deduplication bit array partition;

create a new deduplication bit array partition;

write an oldest of the plurality of deduplication bit array partitions to the permanent storage; and delete the oldest of the plurality of deduplication bit array partitions from the memory; and a deduplication engine, executed by the processing unit, configured to:

receive an expected data item; and determine if the received expected data item has already been received by accessing at least one of the new deduplication bit array partition or one of the plurality of deduplication bit array partitions and identifying the value of the bit associated with the numeric identifier of the received expected data item.

9. The system of claim 8, wherein the deduplication engine is configured to receive expected data items from a plurality of sources.

10. The system of claim 9, wherein an expected data item having a numeric identifier equal to the numeric identifier of the starting expected data item plus an integer L is associated with a bit having a position in the specific deduplication bit array partition of the first bit plus L.

11. The system of claim 9, wherein when the value of the bit in the specific deduplication bit array partition associated with the numeric identifier of the received expected data item is one of either 1 or 0, the deduplication engine is configured to determine that the received expected data item has already been received; and wherein when the value of the bit in the specific deduplication bit array partition associated with the numeric identifier of the received expected data item is the other of either 1 or 0, the deduplication engine is configured to determine that the received expected data item has not already been received and changes the value of the bit to indicate that the received expected data item has now been received.

12. The system of claim 8, wherein the new deduplication bit array partition tracks whether additional data items expected to be received in an additional time unit of the same length as the first time unit have been received.

13. The system of claim 12, wherein upon receiving an additional data item, the deduplication engine is configured to:

determine, based on a numeric identifier of the additional data item, whether to access the new deduplication bit array partition or one of the plurality of deduplication bit array partitions; and determine whether the additional data item has already been received.

14. One or more computer-readable storage media storing computer-executable instructions that, when executed by a computing device, perform a method for deduplicating a dataset, the method comprising:

determining a number N of unique data items expected to be received per time unit, without processing any of the data items, the data items each having a numeric identifier;

creating a plurality of deduplication bit array partitions, the respective deduplication bit array partitions tracking whether data items expected to be received during one time unit have already been received, wherein a size of the respective deduplication bit array partitions corresponds to the number N of unique data items expected to be received during one time unit, wherein the plurality of deduplication bit array partitions are stored in memory;

receiving a data item;

determining if the received data item has already been received by:

identifying a numeric identifier of the received data item, dividing the numeric identifier of the received data item by N to identify a specific deduplication bit array partition, of the plurality of deduplication bit array partitions, that tracks whether data items, including the received data item, expected to be received during a specific time unit have already been received, and performing a modulus N operation on the numeric identifier of the received data item to identify a bit in the specific partition that is associated with the numeric identifier;

deduplicating by deleting the received data item when a value of the bit in the specific partition associated with the numeric identifier indicates that the received data item has already been received;

creating a new deduplication bit array partition;

writing an oldest of the plurality of deduplication bit array partitions to a permanent storage; and deleting the oldest of the plurality of deduplication bit array partitions from the memory.

15. The computer-readable storage media of claim 14, wherein the time unit is one day, and wherein the plurality of deduplication bit array partitions is at least 30 partitions, allowing approximately one month of expected data to be tracked.

16. The computer-readable storage media of claim 14, wherein each of the plurality of deduplication bit array partitions comprises a series of bits each associated with a numeric identifier of a data item.

17. The computer-readable storage media of claim 14, wherein the data items expected to be received have sequential numeric identifiers.

* * * * *